US012804534B2

(12) United States Patent
Tse et al.

(10) Patent No.: US 12,804,534 B2
(45) Date of Patent: Nov. 17, 2026

(54) SYSTEMS AND METHODS FOR ENABLING DUAL CONNECTIVITY BASED ON LINE-OF-SIGHT AND NETWORK SLICE PARAMETERS

(71) Applicant: Verizon Patent and Licensing Inc., Basking Ridge, NJ (US)

(72) Inventors: Lap Tse, Marietta, GA (US); Francisco X. Sevilla R., Eden Prairie, MN (US); David Taft, Keller, TX (US); Shuang Echo Yang, Naperville, IL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 303 days.

(21) Appl. No.: 18/415,161

(22) Filed: Jan. 17, 2024

(65) Prior Publication Data

US 2025/0234284 A1 Jul. 17, 2025

(51) Int. Cl.
*H04W 48/20* (2009.01)
*H04W 24/02* (2009.01)

(52) U.S. Cl.
CPC ........... *H04W 48/20* (2013.01); *H04W 24/02* (2013.01)

(58) Field of Classification Search
CPC ..... H04W 72/23; H04W 24/02; H04W 24/08; H04W 16/28; H04W 72/046; H04W 64/00; H04W 28/0268; H04W 4/029; H04W 72/0453; H04W 56/001; H04W 72/0446; H04W 28/0236; H04W 52/0229; H04W 4/027; H04W 28/0221; H04W 4/46; H04W 4/021; H04W 52/0251; H04W 36/0085; H04W 52/0261; H04W 72/54; H04W 72/542; H04W 84/005; H04W 28/0215; H04W 56/0065; H04W 36/0061; H04W 52/0235; H04W 76/10; H04W 36/0064; H04W 36/32; H04W 36/0005; H04W 36/0044; H04W 36/302; H04W 36/324; H04W 36/00; H04W 36/0088; H04W 36/322; H04W 4/025; H04W 8/08; H04W 52/02; H04W 36/26; H04W 36/008375
See application file for complete search history.

(56) References Cited

U.S. PATENT DOCUMENTS

| | | | | |
|---|---|---|---|---|
| 11,096,096 | B1 * | 8/2021 | Abdel Shahid ....... | H04W 76/16 |
| 2011/0116480 | A1 * | 5/2011 | Li ......................... | H04W 28/04 370/332 |
| 2011/0287778 | A1 * | 11/2011 | Levin .................... | G01S 5/0294 342/461 |
| 2018/0139641 | A1 * | 5/2018 | Costa .................... | H04W 24/02 |
| 2021/0345235 | A1 * | 11/2021 | Prabhakar ............ | H04W 76/11 |

* cited by examiner

*Primary Examiner* — Kwasi Karikari

(57) ABSTRACT

In some implementations, a network device may transmit an indication of physical properties associated with a user equipment (UE), wherein the physical properties include a route associated with the UE. The network device may receive a metric associated with a line-of-sight (LOS) of the UE with a base station, wherein the LOS is while the UE is traveling along the route. The network device may transmit a message to enable dual connectivity for the UE based on the metric and one or more other slice parameters.

20 Claims, 6 Drawing Sheets

SYSTEMS AND METHODS FOR ENABLING DUAL CONNECTIVITY BASED ON LINE-OF-SIGHT AND NETWORK SLICE PARAMETERS

BACKGROUND

Wireless communication systems are widely deployed to provide various telecommunication services such as telephony, video, data, messaging, and broadcasts. A wireless network may include one or more network nodes that support communication for wireless communication devices.

DETAILED DESCRIPTION OF EXAMPLE EMBODIMENTS

Figure 1:
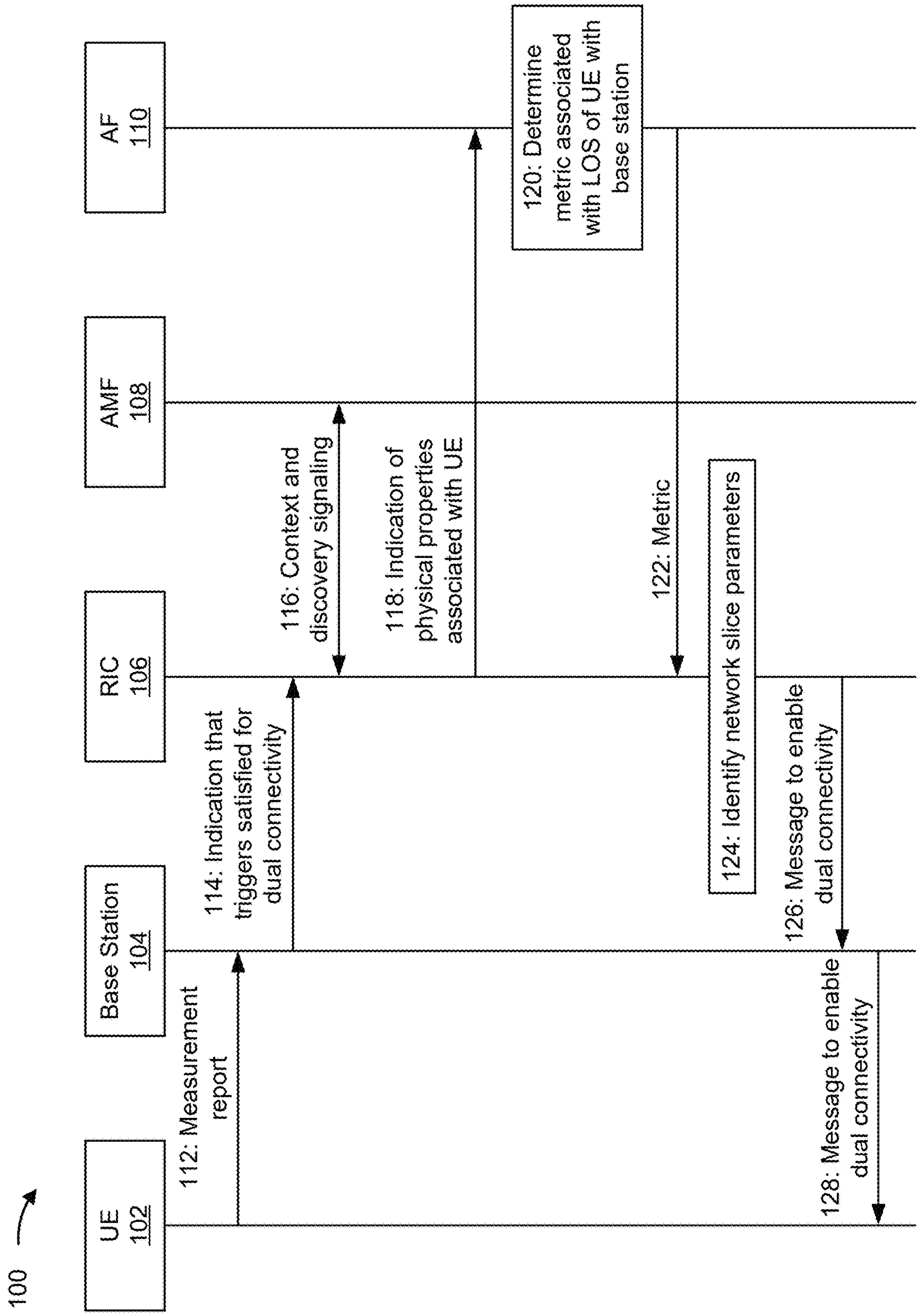
FIG. 1 is a diagram of an example associated with enabling dual connectivity based on line-of-sight (LOS) and network slice parameters.

The following detailed description of example implementations refers to the accompanying drawings. The same reference numbers in different drawings may identify the same or similar elements.

When a UE is configured for dual connectivity, such as Fifth Generation (5G) New Radio (NR) and NR dual connectivity, the UE may be simultaneously connected to both a first frequency range and a second frequency range, which may improve a data rate for the UE. The first frequency range may be associated with a C-band (e.g., FR1). The second frequency range may be associated with an mmWave band (e.g., FR2). The UE may initially be connected to a single frequency range, and then the UE may be triggered to connect to both the first frequency range and the second frequency range using dual connectivity. Dual connectivity may be triggered by a signal strength associated with the UE and/or a status of a data buffer of the UE. For example, when the signal strength satisfies a threshold and/or an amount of data in the data buffer exceeds a certain amount, dual connectivity may be triggered for the UE.

However, a relatively limited set of criteria for enabling dual connectivity (e.g., signal strength and/or data buffer status) may cause the UE to enter dual connectivity even when dual connectivity is disadvantageous for the UE, which may reduce battery life for the UE and/or cause overheating of the UE. For example, when the UE is traveling from a starting location to an ending location, the UE may have a sufficient signal strength at the starting location so that dual connectivity may be triggered. As the UE travels to the ending location, the signal strength may deteriorate, such that dual connectivity may no longer be suitable for the UE. However, the UE may attempt to maintain the dual connectivity, which may drain the battery and/or overheat the UE. Thus, the limited set of criteria for dual connectivity may cause the UE to unnecessarily remain in a dual connectivity state, which may degrade an overall performance of the UE. Further, maintaining the dual connectivity may potentially add unnecessary airlink control messaging, which may congest a control channel when a wireless network is busy.

In some implementations, dual connectivity may be a physical-properties-assisted, slice-aware standalone NR dual connectivity. Such dual connectivity may be triggered by certain factors in addition to signal strength and data buffer status, such as whether a UE is expected to have a line-of-sight (LOS) to a base station. When the UE is expected to have the LOS to the base station, and based on network slice parameters associated with the UE, dual connectivity may be triggered for the UE. When the UE is not expected to have the LOS to the base station and/or based on the network slice parameters, dual connectivity may not be triggered for the UE, even when the signal strength and the data buffer status would otherwise trigger dual connectivity.

In some implementations, an application function (AF) in a wireless network may determine whether the UE is expected to have the LOS to the base station. The AF may use geographic information system (GIS) three-dimensional (3D) path rendering and information on antenna radiation centers to determine whether the UE is expected to have the LOS to the base station. The AF may determine, for a travel path associated with the UE, a route LOS. The route LOS may indicate a percentage of time that the UE is expected to have the LOS to the base station (or a percentage of time that the UE is expected to have no LOS (e.g., non-line-of-sight (NLOS)) to the base station), while the UE is traveling along a route. The route LOS may be determined using high-resolution terrain data. For example, the AF may determine, for a travel path from a starting location to a destination, that the UE is expected to have an LOS to the base station for approximately 90% of the travel path, which may be determined based on the GIS 3D path rendering and the information on antenna radiation centers.

In some implementations, the AF may transmit, to a radio access network (RAN) intelligent controller (RIC) in the wireless network, an indication of the route LOS. The RIC may use the route LOS and parameters in a network slice as criteria for determining whether dual connectivity is suitable for the UE. For example, such parameters may indicate whether a network slice is for a smart phone, or whether the UE is mounted on a vehicle, which may mitigate concern for saving battery life and provide greater heat dissipation (as opposed to a smartphone being carried by a user or placed in a user's pocket). The RIC may determine when dual connectivity is best served based on radio frequency (RF) and other contributing factors. When the RIC determines that the route LOS and the network slice parameters meet certain criteria, the RIC may provide an indication to the base station to add dual connectivity for the UE. On the other hand, when the RIC determines that the route LOS and/or the network slice parameters do not meet the certain criteria, the RIC may not provide any indication to the base station to add dual connectivity for the UE.

In some implementations, by defining dual connectivity to incorporate LOS and network slice parameters, dual connectivity may not be triggered when the UE does not have LOS to the network node and/or when the UE is associated with certain network slice parameters, even when a signal strength and a data buffer status would otherwise trigger dual connectivity. As a result, in certain situations, the UE may not initiate dual connectivity, thereby saving battery life for the UE and avoiding overheating of the UE. Criteria for triggering dual connectivity may be modified to include LOS and network slice parameters, which may improve an overall performance of the UE. Further, by not triggering dual connectivity in certain situations, unnecessary airlink control messaging may be avoided.

FIG. 1 is a diagram of an example 100 associated with enabling dual connectivity based on LOS and network slice parameters. As shown in FIG. 1, example 100 includes a UE 102, a base station 104, an RIC 106, an application and management function (AMF) 108, and an AF 110.

As shown by reference number 112, the UE 102 may transmit, to the base station 104, a measurement report. The measurement report may indicate measurements for a plurality of frequency ranges, which may include FR2. The measurements may include reference signal received power (RSRP) measurements, reference signal received quality (RSRQ) measurements, and/or signal-to-interference-plus-noise ratio (SINR) measurements.

As shown by reference number 114, the base station 104 may transmit, to the RIC 106, an indication that one or more triggers for dual connectivity are satisfied. The one or more triggers may be satisfied based on the measurement report received from the UE. For example, a signal strength of a certain frequency range, as indicated by the measurement report, may satisfy one or more thresholds, which may cause the one or more triggers for dual connectivity to be satisfied.

However, even though the one or more triggers for dual connectivity may be satisfied, dual connectivity may be conditional on a route LOS and network slice parameters, as described herein, and the RIC 106 may make no decision on whether to trigger dual connectivity for the UE 102 until the RIC 106 confirms that the route LOS and the network slice parameters are suitable for dual connectivity.

As shown by reference number 116, the RIC 106 may exchange context and discovery signaling with the AMF 108, which may allow the RIC 106 to be notified of a suitable AF 110. The AF 110 may be responsible for determining the route LOS using GIS 3D path rendering and information on antenna radiation centers.

As shown by reference number 118, the RIC 106 may transmit, to the AF 110, an indication of physical properties associated with the UE 102. The physical properties may include a route associated with the UE, a latitude associated with the UE 102, a longitude associated with the UE 102, a speed associated with the UE 102, a data buffer status associated with the UE 102, or a temperature associated with the UE 102. The physical properties may include positioning information associated with the UE 102. The positioning information may include X, Y, and Z coordinates associated with the UE 102, where X represents a horizontal position of the UE 102, Y represents a vertical position of the UE 102, and Z represents a height and/or elevation of the UE 102. The RIC 106 may receive information regarding the physical properties from the base station 104 and/or the UE 102.

As shown by reference number 120, the AF 110 may determine a metric associated with the LOS of the UE 102 with the base station 104, where the LOS metric is determined while the UE 102 is traveling along the route. The metric may be associated with the path LOS. The metric (or path LOS) may indicate a percentage of time, while the UE 102 is traveling along the route, that the UE 102 is expected to have the LOS with the base station 104. Alternatively, the metric may indicate a percentage of the route during which the UE 102 is expected to have the LOS with the base station 104. The AF 110 may determine the metric using high-resolution terrain data, LOS data, clutter data, and/or information regarding an antenna radiation center associated with the base station 104. The AF 110 may retrieve the high-resolution terrain data and/or other types of data from a GIS.

As shown by reference number 122, the AF 110 may transmit, to the RIC 106, an indication of the metric. For example, the metric may indicate that the UE 102 is expected to have an LOS with the base station 104 for 90% of the route (e.g., there are only certain streets for which the UE 102 may not have LOS to the base station 104). As another example, the metric may indicate, for a route that is estimated to take 30 minutes, the UE 102 is expected to have an LOS with the base station 104 for 25 minutes of the 30 minutes.

As shown by reference number 124, the RIC 106 may identify one or more network slice parameters. The one or more network slice parameters may be associated with single network slice selection assistance information (S-NSSAI). The S-NSSAI may include an indication of whether the UE 102 is a smart phone or a customer premises equipment (CPE). The S-NSSAI may include an indication of whether the UE 102 is configured for connected mode discontinuous reception (C-DRX). The S-NSSAI may include an indication of whether the UE 102 is battery powered or connected to a power source. The S-NSSAI may include an indication of whether the UE 102 is mounted to a surface. The S-NSSAI may include an indication of whether the UE 102 is to optimize latency. The S-NSSAI may include an indication of whether the UE 102 is to optimize throughput. The S-NSSAI may include an indication of whether the UE 102 is to optimize battery life.

As shown by reference number 126, the RIC 106 may transmit, to the base station 104, a message to enable dual connectivity for the UE 102 based on the metric and one or more network slice parameters, in addition to a signal strength and a data buffer status. The dual connectivity may be based on a first frequency range (e.g., a C-band, which may correspond to FR1) and a second frequency range (e.g., a mmWave band, which may correspond to FR2). The RIC 106 may determine to enable or trigger dual connectivity for the UE 102 when the metric satisfies a threshold. For example, the RIC 106 may determine to enable or trigger dual connectivity for the UE 102 when the percentage of time or the percentage of the route associated with having LOS with the base station 104 satisfies a threshold. The RIC 106 may determine to enable or trigger dual connectivity for the UE 102 when certain network slice parameters are set. For example, when the network slice parameters indicate that the UE 102 is connected to a power source (e.g., is not battery operated) and/or the UE 102 is mounted to an exterior surface of a vehicle (which may cause heat dissipation to not be an issue depending on weather), the RIC 106 may determine to enable or trigger dual connectivity for the UE 102.

As shown by reference number 128, the base station 104 may transmit, to the UE 102, a message to enable dual connectivity for the UE 102. The UE 102 may initiate appropriate signaling with the base station 104 for establishing dual connectivity.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
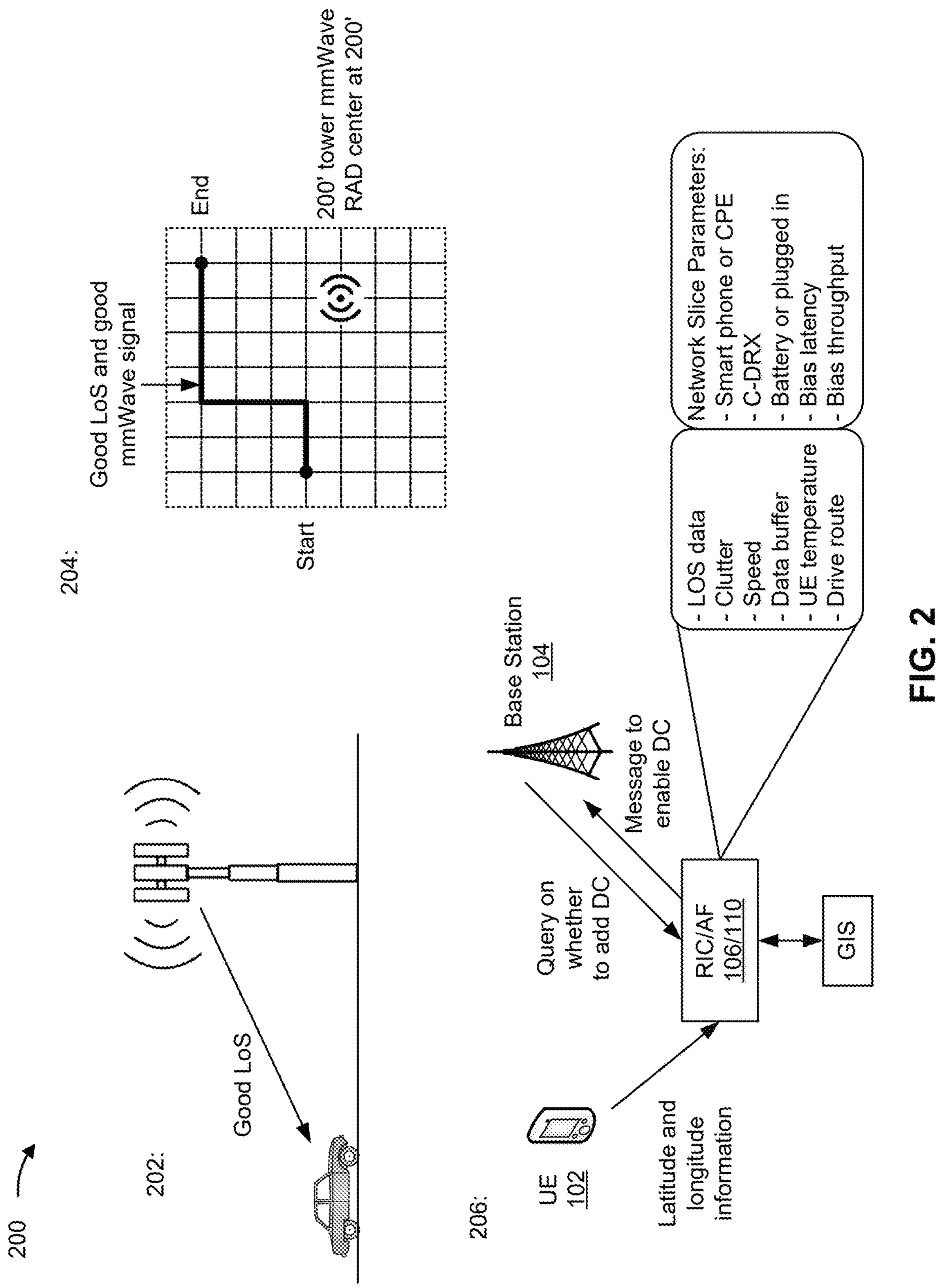
FIG. 2 is a diagram of an example associated with enabling dual connectivity based on LOS and network slice parameters.

FIG. 2 is a diagram of an example 200 associated with enabling dual connectivity based on LOS and network slice parameters.

As shown by reference number 202, a base station 104 (e.g., an mmWave node) may be mounted on a relatively tall tower (e.g., a 200-foot-tall tower). A UE 102, when traveling along a route, may have LOS with the base station 104 due to its relatively tall height. The UE 102 may be associated with a vehicle that is traveling along the route (e.g., the UE 102 may be inside the vehicle).

As shown by reference number 204, the UE 102 may be traveling along a route from a starting location to an ending location. A majority of the route may be associated with LOS and a relatively good mmWave signal.

As shown by reference number 206, the base station 104 may transmit a query regarding whether to add NR dual connectivity for the UE 102. In response to the query, an RIC 106 and/or an AF 110 may determine whether NR dual connectivity should be added for the UE 102. The RIC 106 and/or an AF 110 may determine a metric associated with the LOS of the UE 102 with the base station 104, where the LOS metric is determined while the UE 102 is traveling along the route. The metric may indicate a route LOS, which may correspond to a percentage of the route for which the UE 102 has an LOS with the base station 104. The RIC 106 and/or the AF 110 may determine the metric using LOS data, clutter data (e.g., data indicating buildings, relatively large objects, etc., on a portion of land), speed data associated with the UE 102, a data buffer status of the UE 102, a temperature associated with the UE 102, and/or the route taken by the UE 102. The LOS data and the clutter data may be retrieved from a GIS. The RIC 106 and/or an AF 110 may identify S-NSSAI (e.g., smart phone, C-DRX, connected to power source, bias latency, and/or bias throughput). The RIC 106 and/or an AF 110 may indicate, to the network node 104, that NR dual connectivity should be added for the UE 102, which may be based on the metric and the S-NSSAI. For example, the RIC 106 and/or an AF 110 may determine that NR dual connectivity should be added based on the metric indicating that 98% of the route has LOS and a good mmWave signal, which may satisfy a threshold. As a result, the UE 102 may be connected to both a C-band and an mmWave band using NR dual connectivity. The RIC 106 and/or the base station 104 may enable NR dual connectivity by adding the mmWave band to the C-band.

As indicated above, FIG. 2 is provided as an example. Other examples may differ from what is described with regard to FIG. 2.

Figure 3:
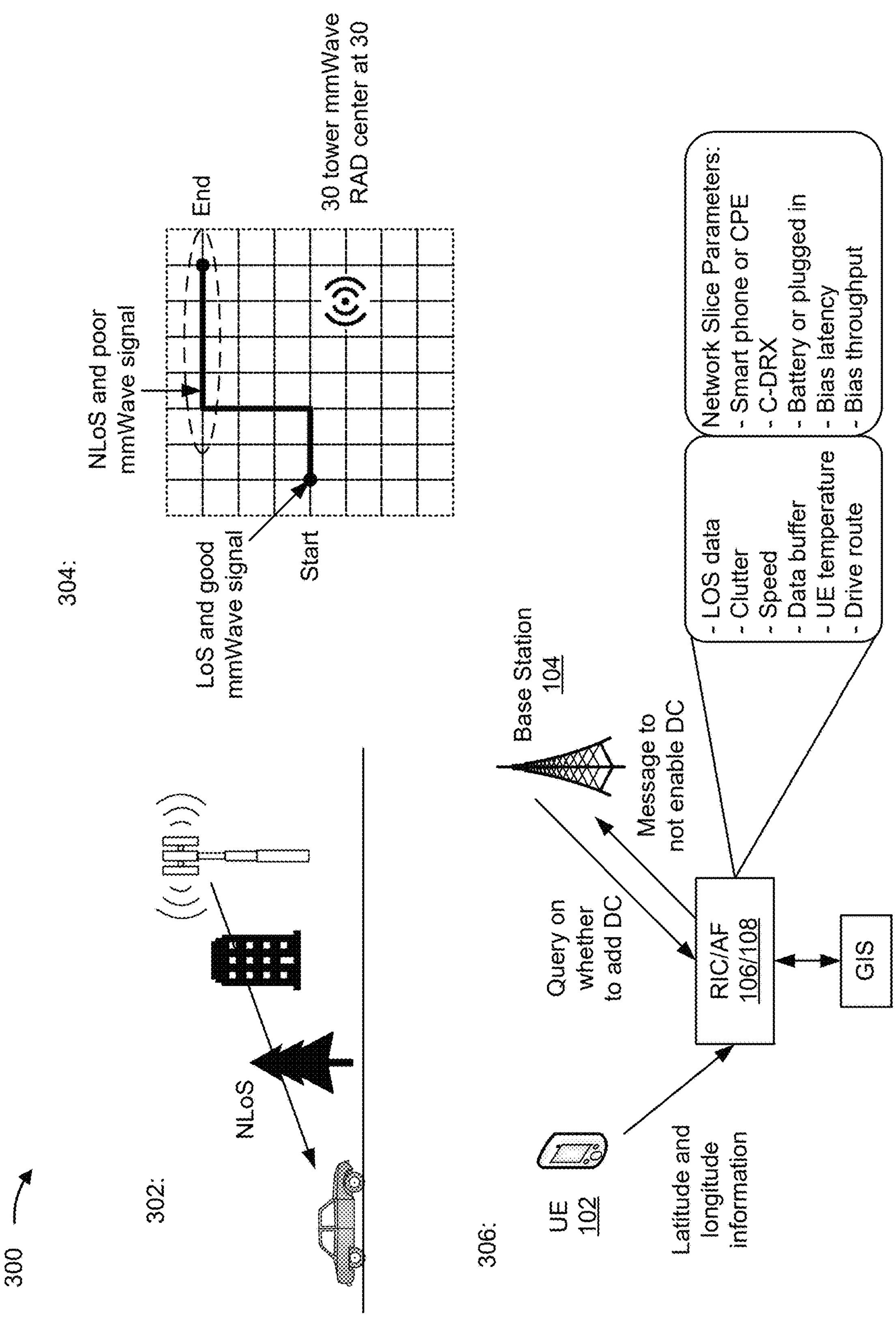
FIG. 3 is a diagram of an example associated with enabling dual connectivity based on LOS and network slice parameters.

FIG. 3 is a diagram of an example 300 associated with enabling dual connectivity based on LOS and network slice parameters.

As shown by reference number 302, a base station 104 (e.g., an mmWave node) may be mounted on a relatively short tower (e.g., a 30-foot-tall tower). A UE 102, when traveling along a route, may have a relatively poor LOS with the base station 104 due to its relatively short height. The UE 102 may be associated with a vehicle that is traveling along the route (e.g., the UE 102 may be inside the vehicle).

As shown by reference number 304, the UE 102 may be traveling along a route from a starting location to an ending location. Portions of the route may be associated with relatively poor LOS and a relatively poor mmWave signal. For example, the starting location may be associated with LOS and a relatively good RF signal, but portions of the route may be associated with NLOS and a relatively poor RF signal. The NLOS may be due to buildings, trees, and/or other objects between the UE 102 and the base station 104.

As shown by reference number 306, the base station 104 may transmit a query regarding whether to add NR dual connectivity for the UE 102. In response to the query, an RIC 106 and/or an AF 110 may determine whether NR dual connectivity should be added for the UE 102. The RIC 106 and/or an AF 110 may determine a metric associated with the LOS of the UE 102 with the base station 104, where the LOS metric is determined while the UE 102 is traveling along the route. The metric may indicate a route LOS, which may correspond to a percentage of the route for which the UE 102 has an LOS with the base station 104. The RIC 106 and/or the AF 110 may determine the metric using LOS data, clutter data (e.g., data indicating buildings, relatively large objects, etc., on a portion of land), speed data associated with the UE 102, a data buffer status of the UE 102, a temperature associated with the UE 102, and/or the route taken by the UE 102. The LOS data and the clutter data may be retrieved from a GIS. The RIC 106 and/or an AF 110 may identify S-NSSAI (e.g., smart phone, C-DRX, battery powered, and/or bias battery life). The RIC 106 and/or an AF 110 may indicate, to the network node 104, that NR dual connectivity should not be added for the UE 102, which may be based on the metric and the S-NSSAI. For example, the RIC 106 and/or an AF 110 may determine that NR dual connectivity should not be added based on the metric indicating that only 15% of the route has LOS (e.g., 85% of the route has NLOS) and a good mmWave signal, which may not satisfy a threshold. As a result, the UE 102 may remain connected to only a C-band using single connectivity. The RIC 106 and/or the base station 104 may not enable NR dual connectivity by not adding the mm Wave band to the C-band.

As indicated above, FIG. 3 is provided as an example. Other examples may differ from what is described with regard to FIG. 3.

Figure 4:
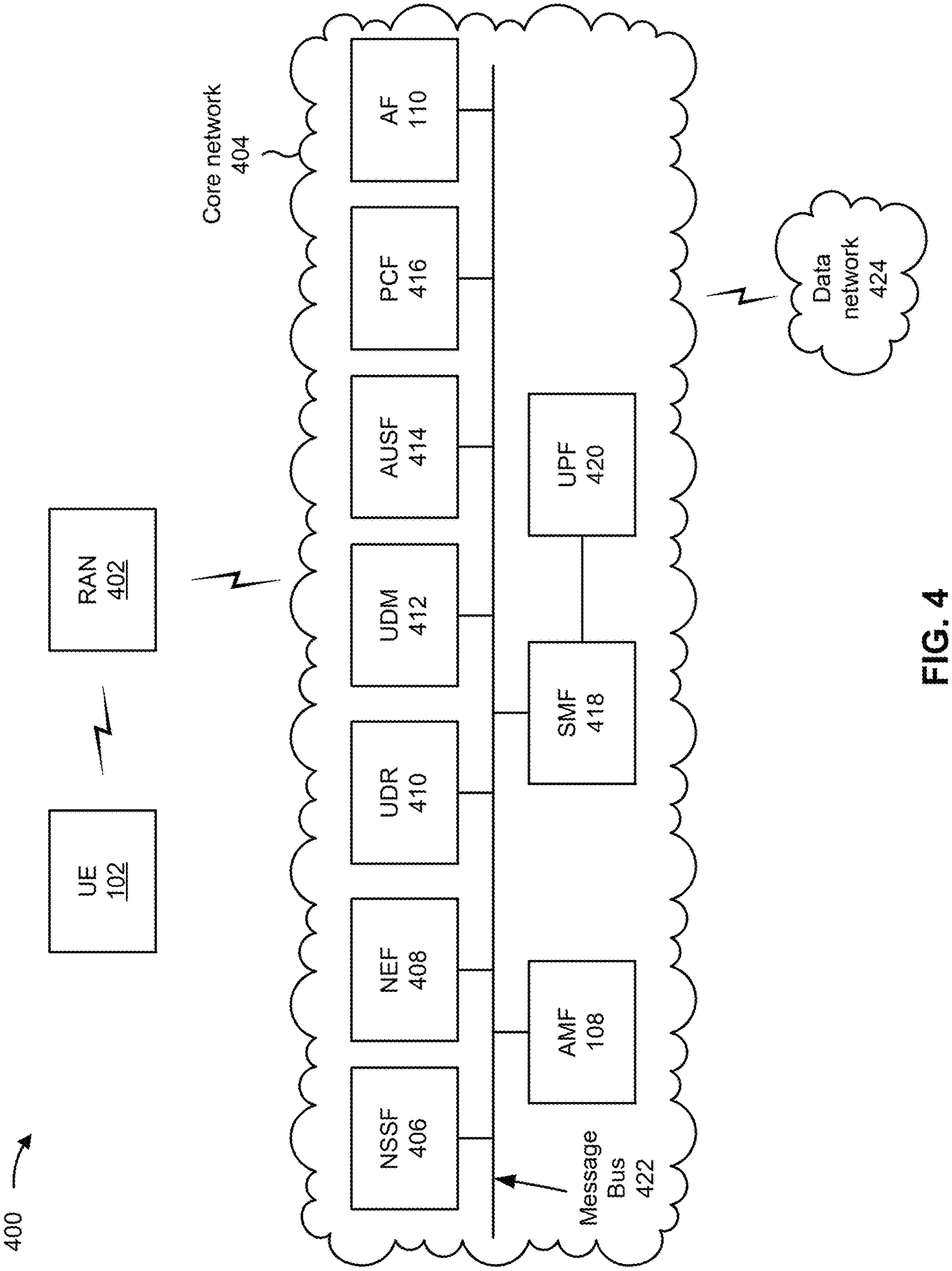
FIG. 4 is a diagram of an example environment in which systems and/or methods described herein may be implemented.

FIG. 4 is a diagram of an example environment 400 in which systems and/or methods described herein may be implemented. As shown in FIG. 4, example environment 400 may include a UE 102, a radio access network (RAN) 402, a core network 404, and a data network 424. Devices and/or networks of example environment 400 may interconnect via wired connections, wireless connections, or a combination of wired and wireless connections.

The UE 102 may include one or more devices capable of receiving, generating, storing, processing, and/or providing information, such as information described herein. For example, The UE 102 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 402 may support, for example, a cellular radio access technology (RAT). The RAN 402 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 102. A base station may be a disaggregated base station. The disaggregated base station may be configured to utilize a protocol stack that is physically or logically distributed among two or more nodes, which may include a radio unit (RU), a distributed unit (DU), and a centralized unit (CU). The RAN 402 may transfer traffic between the UE 102 (e.g., using a cellular RAT), one or more base stations (e.g., using a wireless interface or a backhaul interface, such as a wired backhaul interface), and/or the core network 404. The RAN 402 may provide one or more cells that cover geographic areas.

In some implementations, the RAN 402 may perform scheduling and/or resource management for the UE 102 covered by the RAN 402 (e.g., the UE 102 covered by a cell provided by the RAN 402). In some implementations, the RAN 402 may be controlled or coordinated by a network controller, which may perform load balancing, network-level configuration, and/or other operations. The network controller may communicate with the RAN 402 via a wireless or wireline backhaul. In some implementations, the RAN 402 may include a network controller, a self-organizing network (SON) module or component, or a similar module or component. In other words, the RAN 402 may perform network control, scheduling, and/or network management functions (e.g., for uplink, downlink, and/or sidelink communications of the UE 102 covered by the RAN 402).

In some implementations, the core network 404 may include an example functional architecture in which systems and/or methods described herein may be implemented. For example, the core network 404 may include an example architecture of a 5G next generation (NG) core network included in a 5G wireless telecommunications system. While the example architecture of the core network 404 shown in FIG. 4 may be an example of a service-based architecture, in some implementations, the core network 404 may be implemented as a reference-point architecture and/or a 4G core network, among other examples.

As shown in FIG. 4, the core network 404 include a number of functional elements. The functional elements may include, for example, a network slice selection function (NSSF) 406, a network exposure function (NEF) 408, a unified data repository (UDR) 410, a unified data management (UDM) 412, an authentication server function (AUSF) 414, a policy control function (PCF) 416, an AF 110, an AMF 108, a session management function (SMF) 418, and/or a user plane function (UPF) 420. These functional elements may be communicatively connected via a message bus 422. Each of the functional elements shown in FIG. 4 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 406 may include one or more devices that select network slice instances for the UE 102. The NSSF 406 may allow an operator to deploy multiple substantially independent end-to-end networks potentially with the same infrastructure. In some implementations, each slice may be customized for different services. The NEF 408 may include one or more devices that support exposure of capabilities and/or events in the wireless telecommunications system to help other entities in the wireless telecommunications system discover network services.

The UDR 410 may include one or more devices that provide a converged repository, which may be used by network functions to store data. For example, a converged repository of subscriber information may be used to service a number of network functions. The UDM 412 may include one or more devices to store user data and profiles in the wireless telecommunications system. The UDM 412 may generate authentication vectors, perform user identification handling, perform subscription management, and perform other various functions. The AUSF 414 may include one or more devices that act as an authentication server and support the process of authenticating the UE 102 in the wireless telecommunications system.

The PCF 416 may include one or more devices that provide a policy framework that incorporates network slicing, roaming, packet processing, and/or mobility management, among other examples. The AF 110 may include one or more devices that support application influence on traffic routing, access to the NEF 408, and/or policy control, among other examples. The AMF 108 may include one or more devices that act as a termination point for non-access stratum (NAS) signaling and/or mobility management, among other examples. The SMF 418 may include one or more devices that support the establishment, modification, and release of communication sessions in the wireless telecommunications system. For example, the SMF 418 may configure traffic steering policies at the UPF 420 and/or may enforce UE IP address allocation and policies, among other examples. The UPF 420 may include one or more devices that serve as an anchor point for intra-RAT and/or inter-RAT mobility. The UPF 420 may apply rules to packets, such as rules pertaining to packet routing, traffic reporting, and/or handling user plane QoS, among other examples. The message bus 422 may represent a communication structure for communication among the functional elements. In other words, the message bus 422 may permit communication between two or more functional elements.

The data network 424 may include one or more wired and/or wireless data networks. For example, the data network 424 may include an IP multimedia subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of example environment 400 may perform one or more functions described as being performed by another set of devices of example environment 400.

Figure 5:
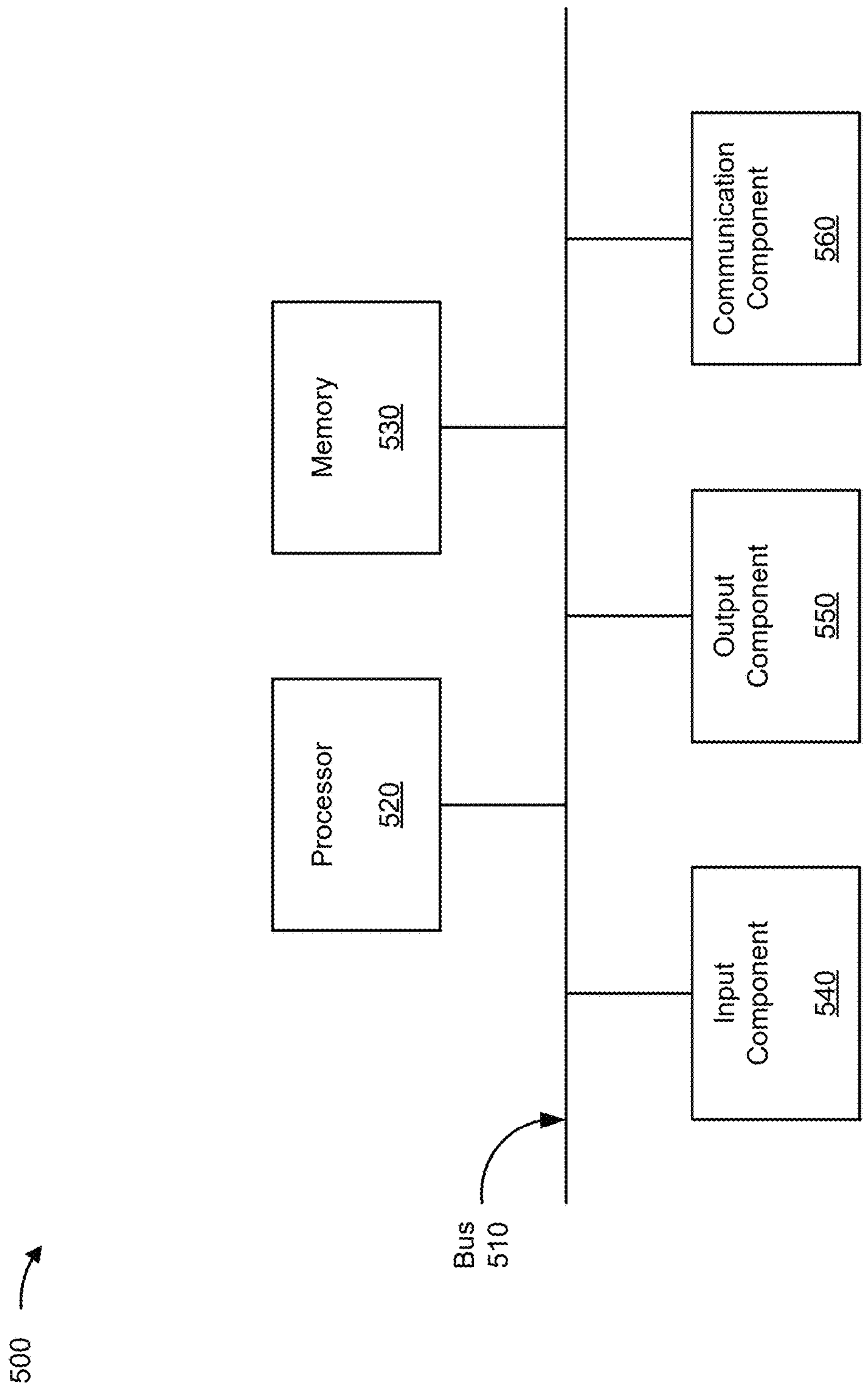
FIG. 5 is a diagram of example components of one or more devices of FIG. 4.

FIG. 5 is a diagram of example components of a device 500 associated with enabling dual connectivity based on LOS and network slice parameters. The device 500 may correspond to a network device (e.g., RIC 106). In some implementations, the network device may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
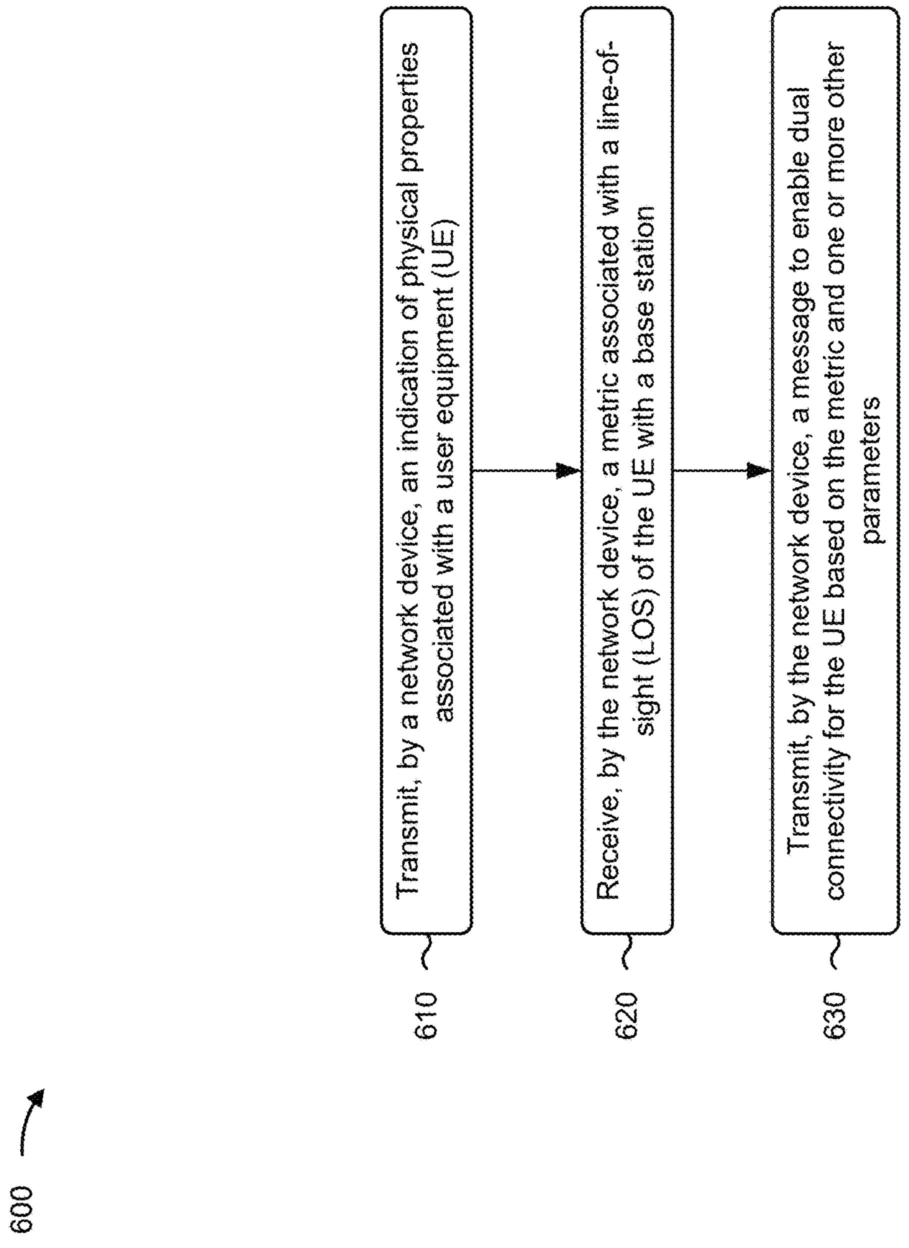
FIG. 6 is a flowchart of an example process associated with enabling dual connectivity based on LOS and network slice parameters.

FIG. 6 is a flowchart of an example process 600 associated with enabling dual connectivity based on LOS and network slice parameters. In some implementations, one or more process blocks of FIG. 6 may be performed by a network device (e.g., RIC 106). In some implementations, one or more process blocks of FIG. 6 may be performed by another entity or a group of entities separate from or including the network device. Additionally, or alternatively, one or more process blocks of FIG. 6 may be performed by one or more components of device 500, such as processor 520, memory 530, input component 540, output component 550, and/or communication component 560.

As shown in FIG. 6, process 600 may include transmitting, by the network device to an AF, an indication of physical properties associated with a UE, wherein the physical properties include a route associated with the UE (block 610). The physical properties may include a latitude associated with the UE, a longitude associated with the UE, a height or elevation associated with the UE, a speed associated with the UE, a data buffer status associated with the UE, and/or a temperature associated with the UE.

As shown in FIG. 6, process 600 may include receiving, by the network device from the AF, a metric associated with an LOS of the UE with a base station, wherein the LOS is while the UE is traveling along the route (block 620). The metric may indicate a percentage of time, while the UE is traveling along the route, that the UE is expected to have the LOS with the base station. The metric may be based on high-resolution terrain data, LOS data, clutter data, and/or information regarding an antenna radiation center associated with the base station.

As shown in FIG. 6, process 600 may include transmitting, by the network device to the base station, a message to enable dual connectivity for the UE based on the metric and one or more other parameters, such as network slice parameters (block 630). The dual connectivity may be based on an FR1 and an FR2. The one or more network slice parameters may be associated with S-NSSAI. The S-NSSAI may include an indication of whether the UE is a smart phone or a CPE, an indication of whether the UE is configured for C-DRX, an indication of whether the UE is battery powered or connected to a power source, an indication of whether the UE is mounted to a surface, an indication of whether the UE is to optimize latency, an indication of whether the UE is to optimize throughput, and/or an indication of whether the UE is to optimize battery life.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

transmitting, by a network device, an indication of physical properties associated with a user equipment (UE), wherein the physical properties include a route associated with the UE;

receiving, by the network device, a metric associated with a line-of-sight (LOS) of the UE with a base station, wherein the LOS is while the UE is traveling along the route;

determining, by the network device, based on the metric and one or more network slice parameters, whether one or more criteria for enabling dual connectivity for the UE are met; and transmitting, by the network device, a message to enable dual connectivity for the UE based on determining that the one or more criteria are met, wherein the network device refrains from transmitting the message when the one or more criteria are not met.

2. The method of claim 1, wherein the physical properties include one or more of: a latitude associated with the UE, a longitude associated with the UE, a height or elevation associated with the UE, a speed associated with the UE, a data buffer status associated with the UE, or a temperature associated with the UE.

3. The method of claim 1, wherein the metric indicates a percentage of time, while the UE is traveling along the route, that the UE is expected to have the LOS with the base station.

4. The method of claim 1, wherein the metric is based on one or more of: high-resolution terrain data, LOS data, clutter data, or information regarding an antenna radiation center associated with the base station.

5. The method of claim 1, wherein the one or more network slice parameters are associated with single network slice selection assistance information (S-NSSAI), and the S-NSSAI includes one or more of:

an indication of whether the UE is a smart phone or a customer premises equipment (CPE), an indication of whether the UE is configured for connected mode discontinuous reception (C-DRX), an indication of whether the UE is battery powered or connected to a power source, an indication of whether the UE is mounted to a surface, an indication of whether the UE is to optimize latency, an indication of whether the UE is to optimize throughput, or an indication of whether the UE is to optimize battery life.

6. The method of claim 1, wherein the network device is a radio access network (RAN) intelligent controller (RIC).

7. The method of claim 1, wherein the dual connectivity is based on a first frequency range and a second frequency range.

8. A network device, comprising:

one or more processors configured to:

transmit an indication of physical properties associated with a user equipment (UE), wherein the physical properties include a route associated with the UE;

receive a metric associated with a line-of-sight (LOS) of the UE with a base station, wherein the LOS is while the UE is traveling along the route;

determine, based on the metric and one or more network slice parameters, whether one or more criteria for enabling dual connectivity for the UE are met; and transmit, to the base station, a message to enable dual connectivity for the UE based on determining that the one or more criteria are met, wherein the network device refrains from transmitting the message when the one or more criteria are not met.

9. The network device of claim 8, wherein the physical properties include one or more of: a latitude associated with the UE, a longitude associated with the UE, a height or elevation associated with the UE, a speed associated with the UE, a data buffer status associated with the UE, or a temperature associated with the UE.

10. The network device of claim 8, wherein the metric indicates a percentage of time, while the UE is traveling along the route, that the UE is expected to have the LOS with the base station.

11. The network device of claim 8, wherein the metric is based on one or more of: high-resolution terrain data, LOS data, clutter data, or information regarding an antenna radiation center associated with the base station.

12. The network device of claim 8, wherein the one or more network slice parameters are associated with single network slice selection assistance information (S-NSSAI), and the S-NSSAI includes one or more of:

an indication of whether the UE is a smart phone or a customer premises equipment (CPE), an indication of whether the UE is configured for connected mode discontinuous reception (C-DRX), an indication of whether the UE is battery powered or connected to a power source, an indication of whether the UE is mounted to a surface, an indication of whether the UE is to optimize latency, an indication of whether the UE is to optimize throughput, or an indication of whether the UE is to optimize battery life.

13. The network device of claim 8, wherein the network device is a radio access network (RAN) intelligent controller (RIC).

14. The network device of claim 8, wherein the dual connectivity is based on a first frequency range and a second frequency range.

15. A non-transitory computer-readable medium storing a set of instructions, the set of instructions comprising:

one or more instructions that, when executed by one or more processors, cause the processors to:

transmit, to an application function (AF), an indication of physical properties associated with a user equipment (UE), wherein the physical properties include a route associated with the UE;

receive, from the AF, a metric associated with a line-of-sight (LOS) of the UE with a base station, wherein the LOS is while the UE is traveling along the route;

determine, based on the metric and one or more network slice parameters, whether one or more criteria for enabling dual connectivity for the UE are met; and transmit, to the base station, a message to enable dual connectivity for the UE based on determining that the one or more criteria are met, wherein the one or more processors refrain from transmitting the message when the one or more criteria are not met.

16. The non-transitory computer-readable medium of claim 15, wherein the physical properties include one or more of: a latitude associated with the UE, a longitude associated with the UE, a height or elevation associated with the UE, a speed associated with the UE, a data buffer status associated with the UE, or a temperature associated with the UE.

17. The non-transitory computer-readable medium of claim 15, wherein the metric indicates a percentage of time, while the UE is traveling along the route, that the UE is expected to have the LOS with the base station.

18. The non-transitory computer-readable medium of claim 15, wherein the metric is based on one or more of: high-resolution terrain data, LOS data, clutter data, or information regarding an antenna radiation center associated with the base station.

19. The non-transitory computer-readable medium of claim 15, wherein the one or more network slice parameters are associated with single network slice selection assistance information (S-NSSAI), and the S-NSSAI includes one or more of:

an indication of whether the UE is a smart phone or a customer premises equipment (CPE), an indication of whether the UE is configured for connected mode discontinuous reception (C-DRX), an indication of whether the UE is battery powered or connected to a power source, an indication of whether the UE is mounted to a surface, an indication of whether the UE is to optimize latency, an indication of whether the UE is to optimize throughput, or an indication of whether the UE is to optimize battery life.

20. The non-transitory computer-readable medium of claim 15, wherein the one or more processors are processors of a radio access network (RAN) intelligent controller (RIC).

* * * * *